Jan. 21, 1964     G. A. DUKE, JR     3,119,003
UTENSIL HOLDDOWN-EQUIPPED BURNER

Filed Sept. 22, 1961     2 Sheets-Sheet 1

*INVENTOR.*
GEORGE A. DUKE, JR.
BY *Barthel & Bugbee*

ATTORNEYS.

Jan. 21, 1964     G. A. DUKE, JR     3,119,003
UTENSIL HOLDDOWN-EQUIPPED BURNER
Filed Sept. 22, 1961     2 Sheets-Sheet 2
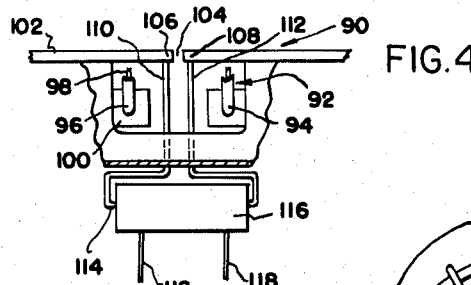
FIG.4
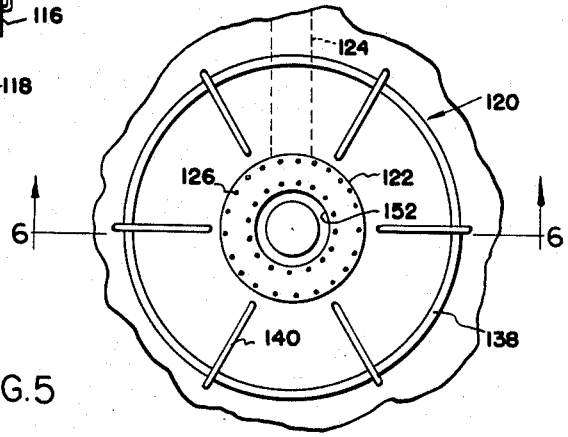
FIG.5
FIG.6
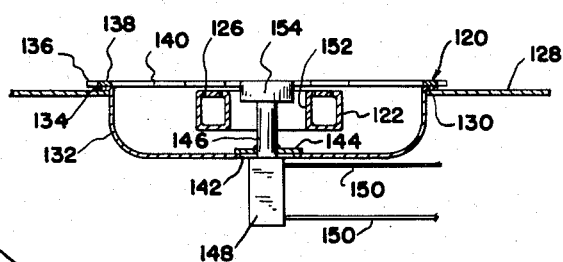
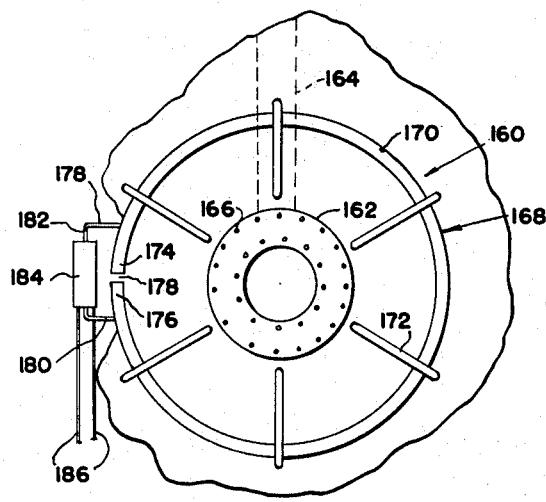
FIG.7
INVENTOR.
GEORGE A. DUKE, JR.
BY Barthel + Bugbee
ATTORNEYS.

United States Patent Office 3,119,003
Patented Jan. 21, 1964

3,119,003
UTENSIL HOLDDOWN-EQUIPPED BURNER
George A. Duke, Jr., 28033 Grand Duke Drive,
Farmington, Mich.
Filed Sept. 22, 1961, Ser. No. 140,125
4 Claims. (Cl. 219—37)

This invention relates to stoves and, in particular, to stove burners.

One object of this invention is to provide a cooking utensil holddown device which magnetically pulls the bottom of a cooking utensil downward toward a stove burner, so as to intensify the conduction of heat from a burner through the bottom wall of the utensil, as well as to prevent spillage of the utensil contents onto the burner resulting from jolting or other undesired shifting of the utensil.

Another object is to provide a cooking utensil holddown device of the foregoing character wherein an electromagnet is mounted adjacent the burner in a position, when energized, to magnetically attract the bottom wall of a ferrous metal cooking utensil, and where the burner is electrically energized, is optionally energized and de-energized automatically in response to the energization and de-energization respectively of the burner.

Another object is to provide a cooking utensil holddown device of the foregoing character wherein the magnetic holddown device is mounted in an open space in the approximate center of the burner so as to magnetically attract the central part of the bottom wall of the utensil and pull it downward into intimate heat-conducting contact with the burner.

Another object is to provide a cooking utensil holddown device of the foregoing character wherein the magnetic holddown device is placed outside the periphery of the burner and optionally combined with the cooking utensil support for the burner.

Another object is to provide a cooking utensil holddown device of the foregoing character, particularly for electric burners where the casing for the heating element is made of ferrous metal and provided with a magnetizing coil so as to itself serve as a holddown magnet for cooking utensils placed thereon.

Other objects and advantages of the invention will become apparent during the course of the following description of the accompanying drawings, wherein:

FIGURE 4 is a fragmentary side elevation, partly in section, of a cooking utensil holddown device according to another modification of the invention wherein the burner-surrounding ring is split and itself made the poles of a cooking utensil holddown magnet;

FIGURE 5 is a top plan view of a gas stove burner equipped with a central magnetic holddown device, according to a further modification of the invention;

FIGURE 6 is a central vertical cross-section taken along the line 6—6 in FIGURE 5; and FIGURE 7 is a top plan view of a gas stove burner equipped with a peripheral magnetic holddown device, according to a still further modification of the invention.

Hitherto, cooking utensils mounted on electric or gas stove burners have been slow in heating because of the resilience or "spring" of the bottom of the utensil pulling itself away from metal-to-metal contact with the burner or away from close proximity to the burner. Furthermore, accidental hitting of the cooking utensil or its handle has frequently caused spilling of the contents of the utensil onto the burner. The present invention, by providing a magnetic holddown device, eliminates these disadvantages where the cooking utensil is provided with a ferrous metal bottom or with a ferrous metal layer upon the bottom.

Figure 1:
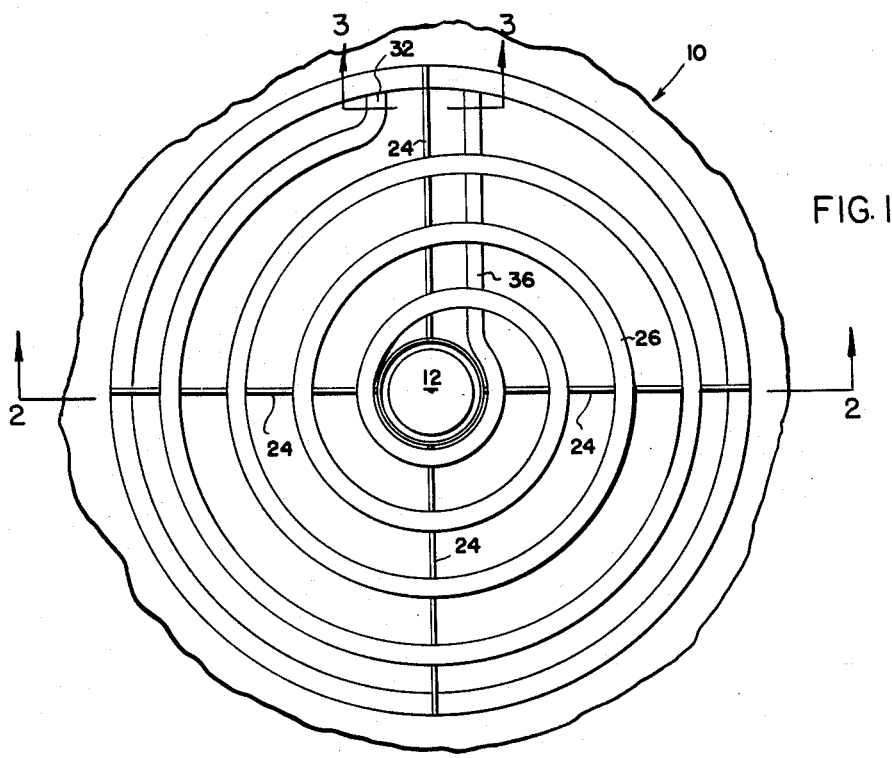
FIGURE 1 is a top plan view of an electric stove burner equipped with a magnetic cooking utensil holddown device, according to one form of the invention.
Figure 2:
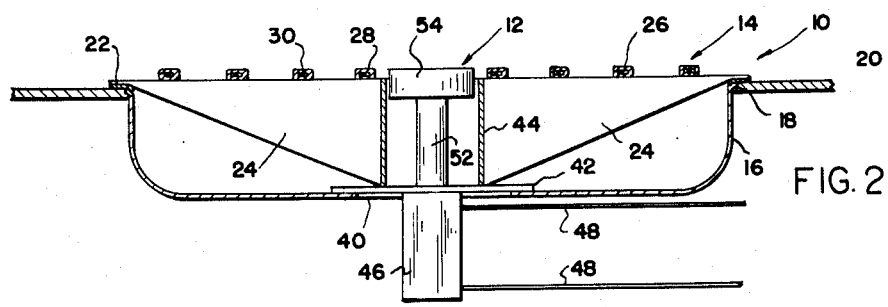
FIGURE 2 is a central vertical cross-section taken along the line 2—2 in FIGURE 1.

Referring to the drawings in detail, FIGURES 1 and 2 show a holddown-equipped burner, generally designated 10, according to one form of the invention, as consisting generally of an electromagnetic holddown device 12 mounted in the central portion of an electric stove burner 14. The burner 14 is of the conventional type consisting of a shallow bowl-shaped support and receptacle 16 mounted in a hole 18 in the stove top 20 and having a marginal ring 22 which, in cooperation with radial supporting plates 24 of approximately triangular shape, support the spiral burner element 26 having a spiral casing 28 enclosing the electrical heating conductor 30. The outer end portion 32 of the outermost convolution 26 (FIGURE 1) is bent parallel to the adjacent radial plate 24, whereas the inner convolution 28 is provided with a longer extension 36 also disposed parallel to the radial supporting plate 24. The opposite ends of the conductor 30 within the end portions 32 and 36 are connected in the usual manner by way of a control switch, to a source of electric current.

The receptacle 16 is provided with a central aperture 40 (FIGURE 2) covered by a disc 42 which supports the inner ends of the triangular plates 24, the outer ends of which are connected to the outer ring 22. Rising from the disc 42 and connected to the inner ends of the triangular plates 24 is a sleeve or tubular member 44. Secured to the lower side of the disc 42 is an electromagnet 46 containing a magnetizing coil (not shown) energized by electrical conductors 48. The electromagnet 46 is provided with a core 52 of magnetizable material, such as soft iron, optionally equipped with a head 54 of similar magnetizable material, the top of which is on the level of the top of the burner casing 28. The conductors 48 are preferably connected in circuit, preferably to a relay or contactor switch (not shown) with the electric burner conductor 30 so as to be energized and de-energized simultaneously therewith. A relay or contactor switch is preferably used because the burner conductor 30 is frequently energized by electric current at a higher voltage, frequently 220 volts, than the house lighting circuit voltage, usually 110 volts, and the electromagnet 46 is conveniently energized by such 110-volt current.

In the operation of the holddown-equipped burner 10, a cooking utensil with a ferrous metal bottom or a ferrous metal layer thereon is placed on the burner 10 in the usual way with the contents which are to be cooked. The operator then turns the switch (not shown) to energize the burner conductor 30 and, and either simultaneously or by means of a separate switch, energizes the electromagnet 46. As a result, the burner casing 26 rapidly becomes heated to a red heat, while at the same time the magnetic head 54 on the core 52 is magnetized. The resulting magnetic field in the vicinity of the head 54 magnetically attracts the central portion of the bottom wall of the cooking utensil and pulls it downward into intimate heat-transferring relationship with the burner casing 28. In this way, the cooking utensil is more rapidly heated than is ordinarily the case, and abrupt shifting or jolting of the utensil is prevented while cooking is taking place, with a consequent prevention of spillage of its contents.

Figure 3:
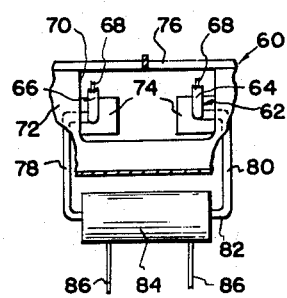
FIGURE 3 is a peripheral vetrical cross-section taken in a location similar to that of the line 3—3 in FIGURE 1, but showing a modification of the invention wherein the electric burner conductor casing is made the poles of a cooking utensil holddown magnet.

The modified holddown-equipped burner, generally designated 60, shown in FIGURE 3 includes an electric burner 62 having a spiral burner conductor 64 with ends 66. The burner conductor casing 64 is of magnetizable material, such as stainless steel and contains the burner conductor 68. The burner casing end portions 64 and 66 pass through an opening 70 in the bowl-shaped receptacle 72 similar to the receptacle 16 of FIGURES 1 and 2, and are secured to supporting plates 74. The receptacle 72 has a surrounding ring 76 similar to the ring 22 in FIGURES 1 and 2.

Also connected to the casing end portions 64 and 66 of the burner 62 are the opposite core extensions 78 and 80 extending outwardly parallel to one another from the central core 82 of an electromagnet 84. The electromagnet 84, as before, is energized through conductors 86 from a suitable source of electric current, as explained in connection with FIGURES 1 and 2.

The operation of the holddown-equipped burner 60 of FIGURE 3 is generally similar to that of the burner 10 of FIGURES 1 and 2 in that the ferrous metal bottom of the cooking appliance is pulled downward against the burner casing when the burner 62 is energized and the electromagnet 84 is also energized. Heat transfer is thus accentuated and jolting of the cooking appliance either prevented or minimized as before.

The further modified holddown-equipped burner, generally designated 90, shown in FIGURE 4, includes an electric burner 92 having a burner conductor casing 94 with ends 96. The burner conductor casing 94, as in FIGURE 1, is of spiral configuration and is made of magnetizable material containing the burner conductor 98. The burner conductor ends 96 are as before attached to supporting plates 100. Surrounding the spiral burner conductor casing 94 is a split ring 102 of magnetizable material with a gap 104 between its opposite ends 106 and 108. Connected to the ends 106 and 108 and extending downwardly therefrom are magnet core extensions 110 and 112 leading to the core 114 of an electromagnet 116 having energizing conductors 118.

The operation of the further modified holddown-equipped burner 90 of FIGURE 4 is generally similar to that of FIGURE 3 in that the ferrous metal bottom of the cooking appliance is also pulled down against the burner ring 102 when the burner 92 is energized and the electromagnet leads 118 are also energized. Heat transfer is again accentuated and jolting and consequent spilling of the contents of the cooking appliance either prevented or minimized, as before.

The still further modified holddown-equipped burner, generally designated 120, shown in FIGURES 5 and 6 includes a gas burner 122 supplied with inflammable gas from a pipe or manifold 124. The burner 122 is supported ordinarily by the pipe 124 and is of hollow annular shape with multiple holes 126 in its top surface. The stove top 128 contains an opening 130 into which a shallow bowl-shaped flanged receptacle 132 is inserted. Mounted on the flange 134 of the receptacle 132 is a cooking utensil support 136 consisting of a peripheral ring 138 to which are secured radially-extending cooking appliance supporting arms 140.

The receptacle 132, as before, is provided with a central opening 142 upon which rests a disc 144 carrying the core 146 of an electromagnet 148 equipped with electrical leads 150 for the magnetizing coil thereof (not shown). The core 126 extends upwardly through the central opening 152 in the gas burner 122 and terminates in a head 154 similar to the head 54 of the holddown device 12 of FIGURES 1 and 2. The top of the head 154 is substantially level with the top of the ring 138.

In the operation of the holddown-equipped gas burner 120, the magnetizing coil (not shown) of the electromagnet 148 is energized by energizing the leads 150 thereof from an ordinary house lighting circuit, usually 110 volts. The gas is turned on and, passing through the pipe or manifold 120, is ignited in the usual way as it emerges from the multiple holes 126 in the burner 122. The consequent magnetization of the core head 154 of the electromagnet 148 again pulls down the ferrous metal bottom of the cooking utensil toward the burner 122, bringing it closer to the flames emerging from the holes 126 and increasing the heating efficiency as well as again preventing jolting or slipping of the cooking utensil.

The additionally modified holddown-equipped burner, generally designated 160, shown in FIGURE 7 is generally similar to the holddown-equipped burner 120 of FIGURES 5 and 6 except that the holddown is accomplished at the periphery of the utensil bottom rather than at the center thereof. The gas burner 162 as before has a gas supply pipe 164 and multiple holes 166 through which the gas emerges and forms the heating and cooking flame. The cooking utensil support 168, however, has a peripheral split ring 170 of magnetizable ferrous metal with radial arms 172 projecting inward toward the burner 162 to support the cooking utensil (not shown). The split ring 170 has opposite ends 174 and 176 separated by a gap 178. Connected to the ends 174 and 176 are the core extensions 178 and 180 of magnetizable material, such as soft iron, leading to the core 182 of an electromagnet 184, the magnetizing coil (not shown) of which is energized by way of leads 186.

In the operation of the form of the invention, shown in FIGURE 7, when the electromagnet 184 is energized by the energization of the leads 186, such as from the house lighting circuit, the split ring 170 becomes an electromagnet and pulls the peripheral portion of the cooking utensil bottom downwardly. This action again increases heating and cooking efficiency and prevents accidental jolting and spillage, as explained above.

What I claim is:

1. A utensil holddown-equipped burner, comprising a burner unit, means for connecting said burner unit to a source of heat energy, a cooking utensil support disposed adjacent said burner unit and comprising an elongated discontinuous member having opposite portions spaced apart from one another, an electromagnet having a core member of magnetizable material disposed near said burner unit and said cooking utensil support, said core member having portions of opposite magnetic polarity, magnetic pole extensions of magnetizable material and of opposite magnetic polarity respectively connecting said core portions of opposite magnetic polarity to said opposite portions of said discontinuous member, and means for connecting said electromagnet to a source of electric current.

2. A utensil holddown-equipped burner, according to claim 1, wherein said discontinuous member includes a split ring of magnetizable material and wherein said magnetic pole pieces of opposite polarity connect said portions of opposite magnetic polarity of said core member respectively to the opposite end portions of said split ring.

3. A utensil holddown-equipped burner, according to claim 1, wherein said discontinuous member includes an electrical heating element casing of magnetizable material with separate opposite ends, wherein an electrical heating conductor is disposed within said casing and wherein the ends of opposite magnetic polarity of said core member are magnetically connected respectively to said casing opposite ends.

4. A utensil holddown-equipped burner, according to claim 1, wherein said discontinuous member includes an electrical heating element casing of approximately spiral configuration with separate ends and of magnetizable material, and wherein said core member has ends of opposite magnetic polarity magnetically connected to said casing ends.

References Cited in the file of this patent

UNITED STATES PATENTS

| | | |
|---|---|---|
| 1,716,329 | Simpson | June 4, 1929 |
| 2,678,991 | Amfitheatrof | May 18, 1954 |
| 2,804,535 | Tuttle | Aug. 27, 1957 |

FOREIGN PATENTS

| | | |
|---|---|---|
| 468,150 | Great Britain | June 30, 1937 |
| 551,932 | France | Apr. 17, 1923 |